(12) United States Patent
Iwakata et al.

(10) Patent No.: US 9,981,583 B2
(45) Date of Patent: May 29, 2018

(54) VEHICLE SEAT (71) Applicant: TS TECH CO., LTD., Saitama (JP)

(72) Inventors: So Iwakata, Tochigi (JP); Yasuhiro Tsuji, Wako (JP); Kenro Azuma, Wako (JP)

(73) Assignee: TS TECH CO., LTD., Saitama (JP)

( * ) Notice: Subject to any disclaimer, the term of this patent is extended or adjusted under 35 U.S.C. 154(b) by 0 days. days.

(21) Appl. No.: 15/113,355

(22) PCT Filed: Jan. 20, 2015

(86) PCT No.: PCT/JP2015/051303
§ 371 (c)(1),
(2) Date: Jul. 21, 2016

(87) PCT Pub. No.: WO2015/111559
PCT Pub. Date: Jul. 30, 2015

(65) Prior Publication Data
US 2017/0001548 A1    Jan. 5, 2017

(30) Foreign Application Priority Data
Jan. 22, 2014    (JP) .................................. 2014-009926

(51) Int. Cl.
*B60N 2/64*    (2006.01)
*B60N 2/58*    (2006.01)
(Continued)

(52) U.S. Cl.
CPC ............. *B60N 2/646* (2013.01); *B60N 2/289* (2013.01); *B60N 2/2893* (2013.01); *B60N 2/58* (2013.01); *B60N 2/70* (2013.01)

(58) Field of Classification Search
CPC ..... B60N 2/289; B60N 2/5883; B60N 2/2887
See application file for complete search history.

(56) References Cited

U.S. PATENT DOCUMENTS 6,234,572 B1    5/2001    Shiino et al.
6,334,649 B1 *  1/2002    Boegge ................ B60N 2/2827
                                                     297/250.1
(Continued)

FOREIGN PATENT DOCUMENTS

CN    101920668 A    12/2010
JP    2000296733 A    10/2000
(Continued)

OTHER PUBLICATIONS

Office Action issued for counterpart Chinese Patent Application No. 201580005390.4, dated May 24, 2017, 12 pages including English translation.
(Continued)

*Primary Examiner* — Timothy J Brindley
(74) *Attorney, Agent, or Firm* — Hamre, Schumann, Mueller & Larson, P.C.

(57) ABSTRACT

Disclosed is a vehicle seat that includes a seat cushion and a seat back between which an arm provided at a rear side of a child seat is insertable to thereby allow the child seat to be attached to the vehicle seat. The seat cushion includes a seat cushion pad and an outer covering with which the seat cushion pad is covered, wherein the seat cushion pad has a recess for the arm to be inserted therein, the recess being provided at a rear region of an upper surface thereof. The outer covering is configured to extend along a surface of the recess such that the recess is entirely coated therewith.

14 Claims, 8 Drawing Sheets (51) Int. Cl.
*B60N 2/28* (2006.01)
*B60N 2/70* (2006.01)

(56) References Cited

U.S. PATENT DOCUMENTS

| | | | |
|---|---|---|---|
| 6,478,376 B2 | 11/2002 | Hayashi et al. | |
| 9,783,085 B2* | 10/2017 | Nilius | B60N 2/28 |
| 2001/0013716 A1 | 8/2001 | Hayashi et al. | |
| 2004/0084940 A1* | 5/2004 | Morita | B60N 2/2821 |
| | | | 297/253 |
| 2010/0314924 A1 | 12/2010 | Arata et al. | |
| 2011/0156460 A1* | 6/2011 | Abe | B60N 2/2881 |
| | | | 297/250.1 |
| 2016/0001682 A1* | 1/2016 | Imayou | B60N 2/5816 |
| | | | 297/250.1 |
| 2016/0121762 A1* | 5/2016 | Nilius | B60N 2/5825 |
| | | | 297/452.48 |
| 2016/0144751 A1* | 5/2016 | Asaeda | B60N 2/58 |
| | | | 297/253 |
| 2016/0144753 A1* | 5/2016 | del Puerto Camargo | B60N 2/2887 |
| | | | 297/452.48 |
| 2016/0200224 A1* | 7/2016 | Fujikake | B60N 2/289 |
| | | | 297/452.38 |
| 2016/0250948 A1* | 9/2016 | Sekino | B60N 2/6009 |
| | | | 297/452.48 |
| 2016/0257229 A1* | 9/2016 | Ruthinowski | B60N 2/70 |
| 2017/0001548 A1* | 1/2017 | Iwakata | B60N 2/58 |
| 2017/0080830 A1* | 3/2017 | Ruthinowski | B60N 2/2887 |

FOREIGN PATENT DOCUMENTS

| | | | | |
|---|---|---|---|---|
| JP | 2001-171403 A | | 6/2001 | |
| JP | 2001-199271 A | | 7/2001 | |
| JP | 2001-233104 A | | 8/2001 | |
| JP | 2001260731 A | | 9/2001 | |
| JP | 2002-337579 A | | 11/2002 | |
| JP | 2010-155516 A | | 7/2010 | |
| JP | 2010155516 A | * | 7/2010 | B60N 2/6009 |
| JP | 2011121426 A | * | 6/2011 | B60N 2/58 |
| JP | 2015137020 A | * | 7/2015 | B60N 2/58 |

OTHER PUBLICATIONS

International Search Report issued in PCT/JP2015/051303 dated Apr. 21, 2015 (1 page).
Office Action issued for counterpart Japanese Patent Application No. 2014-009926, dated Nov. 21, 2017, pages including partial English translation.
Office Action issued for counterpart Chinese Patent Application No. 201580005390.4, dated Dec. 20, 2017, 15 pages including English translation.
Office Action issued for Taiwanese Patent Application No. 104102023, dated Mar. 19, 2018, 8 pages including English translation.

* cited by examiner

VEHICLE SEAT

TECHNICAL FIELD

The present invention relates to a vehicle seat in which attachment of a child seat thereto is facilitated.

BACKGROUND ART

A car seat in which a seat cushion has recesses provided at a rear region of an upper side thereof such that arms (fix arms) provided at a rear side of a child seat and protruding rearward are insertable in the recesses so that attachment of the child seat to the vehicle seat is facilitated is hitherto known in the art (Patent Document 1). In this car seat, the seat cushion includes an outer covering with which a seat cushion pad of the seat cushion is covered, and the outer covering has slits provided in positions corresponding to the recesses, and the outer covering provided around the recesses is configured to extend over the recesses in an unsupported manner. Also disclosed in the Patent Document 1 as a conventional art is a particular configuration in which an outer covering is provided to extend along the side surfaces of the recesses while the bottom surfaces of the recesses are left uncovered.

CITATION LIST

Patent Literature

Patent Document 1: JP 2001-233104 A

SUMMARY OF INVENTION

With these configurations in which a recess is covered with an outer covering having a slit provided over the recess in an unsupported manner or in which the bottom surface of the recess is left uncovered, however, repeated operations of attachment and removal of a child seat would possibly cause the outer covering to be dislocated relative to the seat cushion pad because the ends of the outer covering provided at the slit or other portions around the recess are not supported; resultantly, interference between the outer covering and the arm could occur upon attachment and removal of the child seat, and the operational ease in attachment would disadvantageously be degraded.

It is thus an object of the present invention to facilitate the attachment of the child seat.

An aspect of the present invention proposed in an attempt to overcome the aforementioned disadvantage is configured as a vehicle seat comprising a seat cushion and a seat back, between which an arm provided at a rear side of a child seat is insertable to thereby allow the child seat to be attached to the vehicle seat, wherein the seat cushion includes a seat cushion pad and an outer covering with which the seat cushion pad is covered, wherein the seat cushion pad has a recess for the arm to be inserted therein, the recess being provided at a rear region of an upper surface thereof, and wherein the outer covering is configured to extend along a surface of the recess such that the recess is entirely coated therewith.

With this configuration, the outer covering is configured such that the recess is entirely coated therewith and no such free end as would be formed at a slit or other portions exist near the recess; thus, the outer covering is unlikely to be dislocated relative to the seat cushion pad. Moreover, since the outer covering is provided along the surface of the recess, it is unlikely that the outer covering's unsupported portion extending over the recess would be unnecessarily dragged when the arm of the child seat is inserted into the recess; therefore, the arm can be inserted into the recess smoothly and a dislocation of the outer covering relative to the seat cushion pad can be suppressed. Accordingly, the attachment of the child seat can be made easy.

In the above-described vehicle seat, the outer covering may be configured to include a first outer covering portion corresponding to the recess and a second outer covering portion corresponding to a position adjacent to the recess, wherein the first outer covering portion and the second outer covering portion are configured as separate members.

With this configuration, even if the members constituting the portion of the outer covering near the recess are formed of a material that is not ductile or stretchy, the outer covering can be easily provided along the recess.

Where the first outer covering portion and the second outer covering portion are configured as separate members, the first outer covering portion and the second outer covering portion may be sewn together along a border between the recess and a portion adjacent to the recess.

With this configuration, the first outer covering portion provided over the recess may be shaped conformably, so that the outer covering can be provided over the recess neatly along the surface of the recess.

Where the first outer covering portion and the second outer covering portion are configured as separate members, the recess may have a bottom surface and a side surface raised from the bottom surface, and the first outer covering portion may include a bottom portion corresponding to the bottom surface and a side portion corresponding to the side surface, wherein the bottom portion and the side portion are configured as separate members.

With this configuration, even if the surface shape of the recess is of a shape not developable on a plane, the first outer covering portion can be designed without difficulty; thus the recess can be given a high degree of flexibility in shape.

Moreover, where the bottom portion and the side portion are configured as separate members, the bottom portion and the side portion may preferably be sewn together along a border between the bottom surface and the side surface.

The bottom portion and the side portion sewn together along the border between the bottom surface and the side surface of the recess as defined above will be able to produce a good outer appearance.

In the above-described vehicle seat, preferably, a seating surface of the seat cushion may be shaped to slope down from front toward rear, and a bottom surface of the recess may have a region configured to slope down from front toward rear along the sloping seating surface.

With this configuration, when the child seat is slid on the seating surface rearward and the arm is subsequently inserted into the recess, the arm can be inserted smoothly without hitching on the bottom surface of the recess.

Where the bottom surface of the recess is sloping down toward the rear, the bottom surface may be configured to have a crest provided in a position opposite to a lower end of the seat back.

With this configuration, a gap between the seat back and the bottom surface is smallest in the position of the crest of the bottom surface that is opposite to the lower end of the seat back, while the gaps in the portions frontward and rearward of the crest of the bottom surface are greater; therefore, when the arm of the child seat is held between the lower end of the seat back and the bottom surface of the recess, the arm can be inserted smoothly into the recess without any unnecessary constraint on the orientation of the arm.

Where the first outer covering portion and the second outer covering portion are configured as separate members, the first outer covering portion and the second outer covering portion may be made of different materials.

With this configuration, irrespective of the material of the second outer covering portion, the material of the first outer covering portion can be selected among any materials suitable for the arm to be inserted therealong, so that improvement in durability and outer appearance can be carried out.

In each of the above-described embodiments of the vehicle seat, the seat cushion may be configured to have an opening provided to extend therethrough in an upward-downward direction at a left or right side of the recess, the opening extending from a position rearward of the recess to a position frontward of the recess.

With this configuration, a portion of the seat cushion pad corresponding to the recess can be made more easily deformable in comparison with an alternative configuration in which no opening is provided at the left or right side of the recess; therefore, the arm of the child seat can be inserted with increased ease.

In each of the above-described embodiments of the vehicle seat, the seat cushion pad may be configured to include a reinforcing member under the recess.

With this configuration, decrease in rigidity of the seat cushion pad caused by formation of the recess therein can be compensated for by the reinforcing member, and thus the seat cushion can be made easily attachable to the seat frame.

The other features and advantages of the present invention will become more apparent in the following description made with reference to the accompanying drawings.

BRIEF DESCRIPTION OF DRAWINGS

FIG. 2 includes (a) a sectional side view and (b) a partial enlarged view of the car seat shown in a state before attachment of a child seat to the car seat.

FIG. 5 includes (a) an enlarged perspective view of a recess and its vicinity of the seat cushion, and (b) a sectional view taken along line X-X of (a).

FIG. 6 includes (a) a sectional side view and (b) a partial enlarged view of the car seat shown in a state after attachment of a child seat to the car seat.

FIG. 7 includes (a) an enlarged perspective view of a recess and its vicinity of the seat cushion implemented according to a first modified example, and (b) a sectional view taken along line Y-Y of (a).

FIG. 8 includes (a) an enlarged perspective view of a recess and its vicinity of the seat cushion implemented according to a second modified example, and (b) a sectional view taken along line Z-Z of (a).

DESCRIPTION OF EMBODIMENTS

Figure 1:
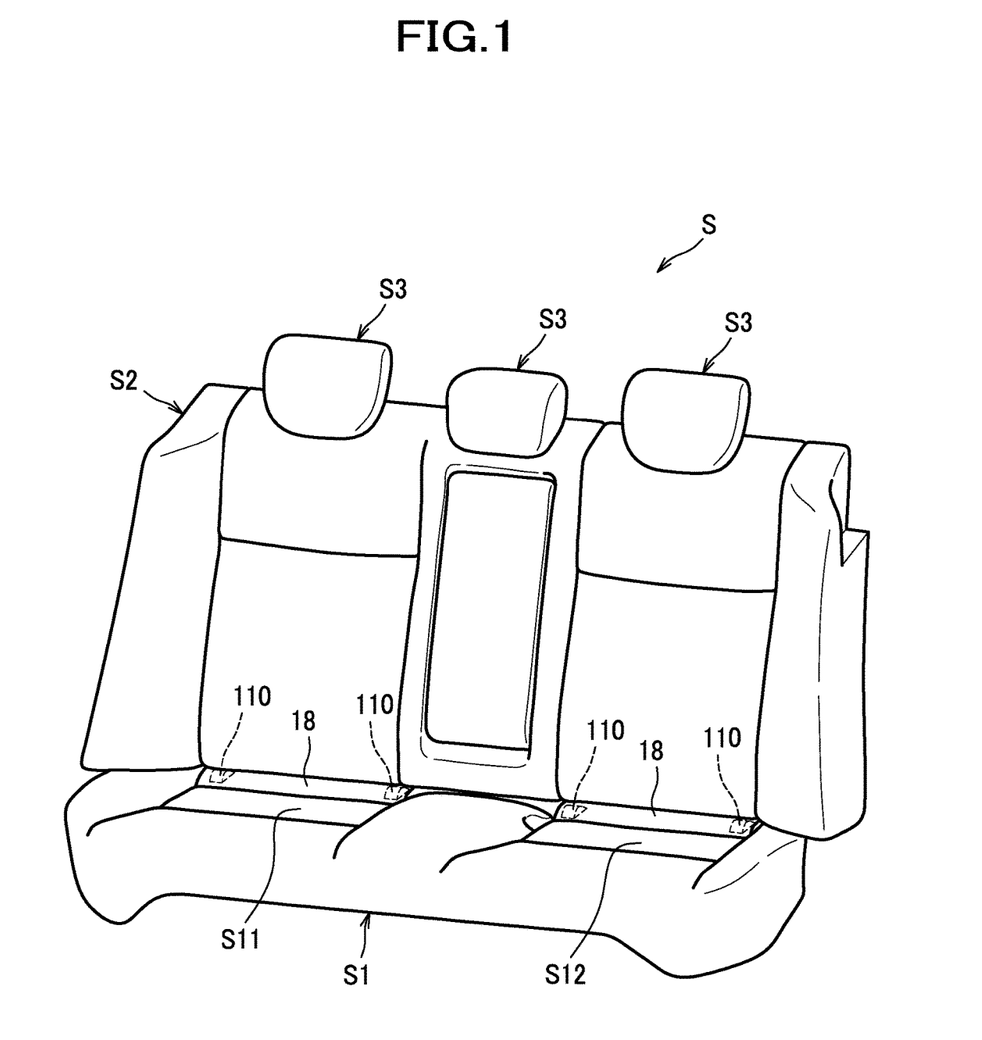
FIG. 1 is a perspective view of a car seat as a vehicle seat according to one embodiment.

Hereafter, one embodiment of the present invention will be described in detail with reference made to the drawings where appropriate. As shown in FIG. 1, a car seat S as an example of a vehicle seat is a seat for use in a rear seat of an automobile, and mainly includes a seat cushion S1, a seat back S2 and a headrest S3. The seat cushion S1 is one that can seat three persons as is generally adopted in a passenger automobile, and includes a seating surface S11 corresponding to the right seat bottom and a seating surface S12 corresponding to the left seat bottom, each configured as a shallowly recessed seating surface. It is to be noted that the front/rear (frontward/rearward), upper/lower (upward/downward) and left/right (leftward/rightward; lateral) directions in the description are designated with reference to an occupant seated on the car seat S. In the present embodiment, the seat cushion S1 and the seat back S2 are configured to be fixed relative to each other; however, in another embodiment where they are movable, a description should be understood as being given with reference to the state in which a passenger normally can be seated thereon.

Figure 2:
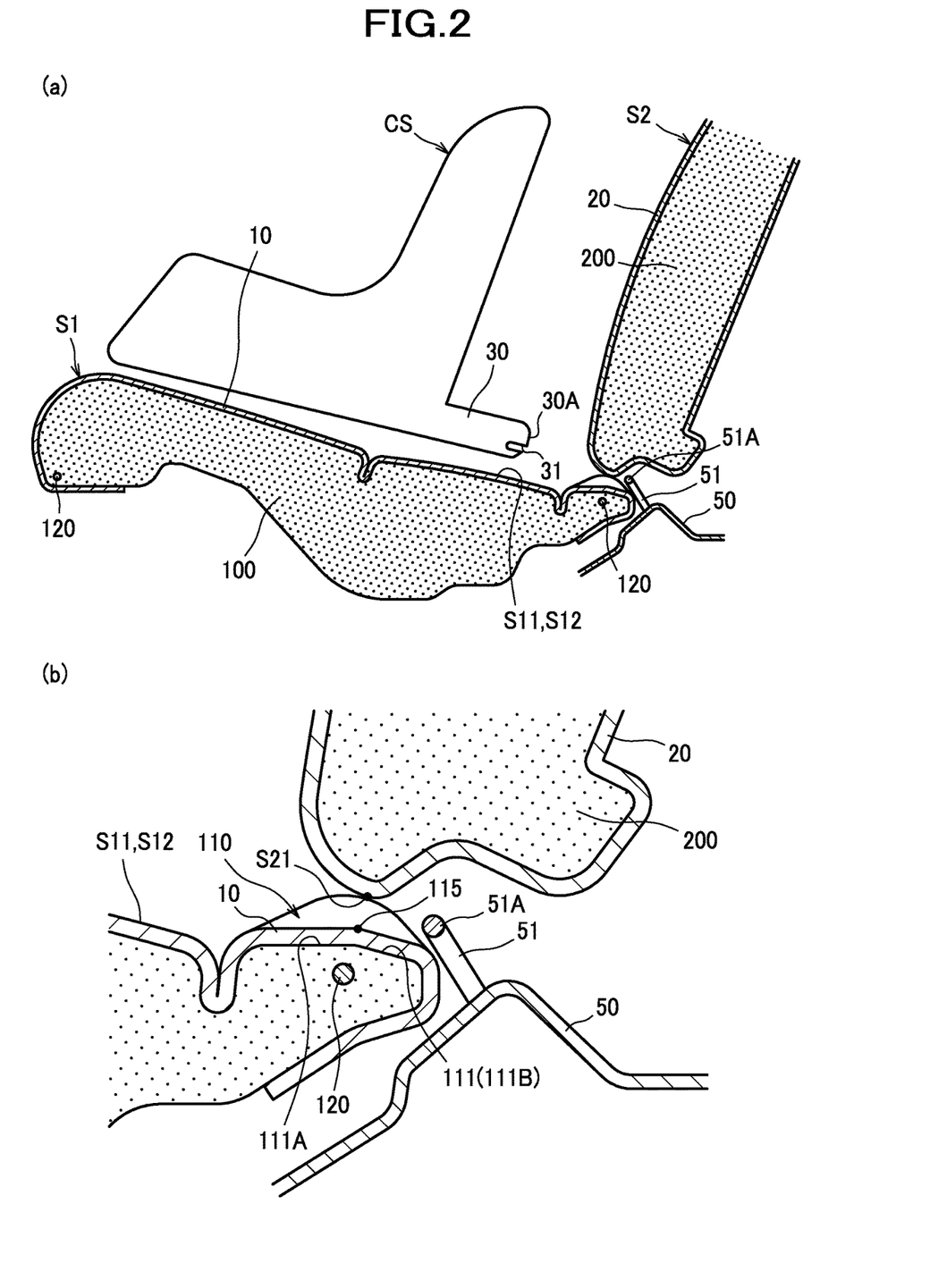

The seat cushion S1 and the seat back S2 are configured to incorporate a frame (not shown); as shown in FIG. 2, the frame of the seat cushion S1 is upholstered with a seat cushion pad 100 made of urethane foam or the like and an outer covering 10 made of fabric, leather, synthetic leather or the like provided over the outside of the seat cushion pad 100. The seat back S2 is also upholstered with a seat back pad 200 made of urethane foam or the like and an outer covering 20 provided over the outside of the seat back pad 200.

A child seat CS to be attached to the car seat S includes arms 30 provided in a lower end portion at a rear side of the child seat CS and configured to protrude rearward. Each arm 30 has a groove 31 frontwardly recessed in a rear end face 30A and configured to extend laterally across the breadth. This groove 31 is a structure configured to be engageable with an engageable portion 51A of a striker 51 fixed to a vehicle body 50 by using a latch (not shown) to allow the child seat CS to be stably supported on the vehicle body 50. It is to be understood that the striker 51 may be fixed to the frame of the seat cushion S1 or the frame of the seat back S2.

Figure 3:
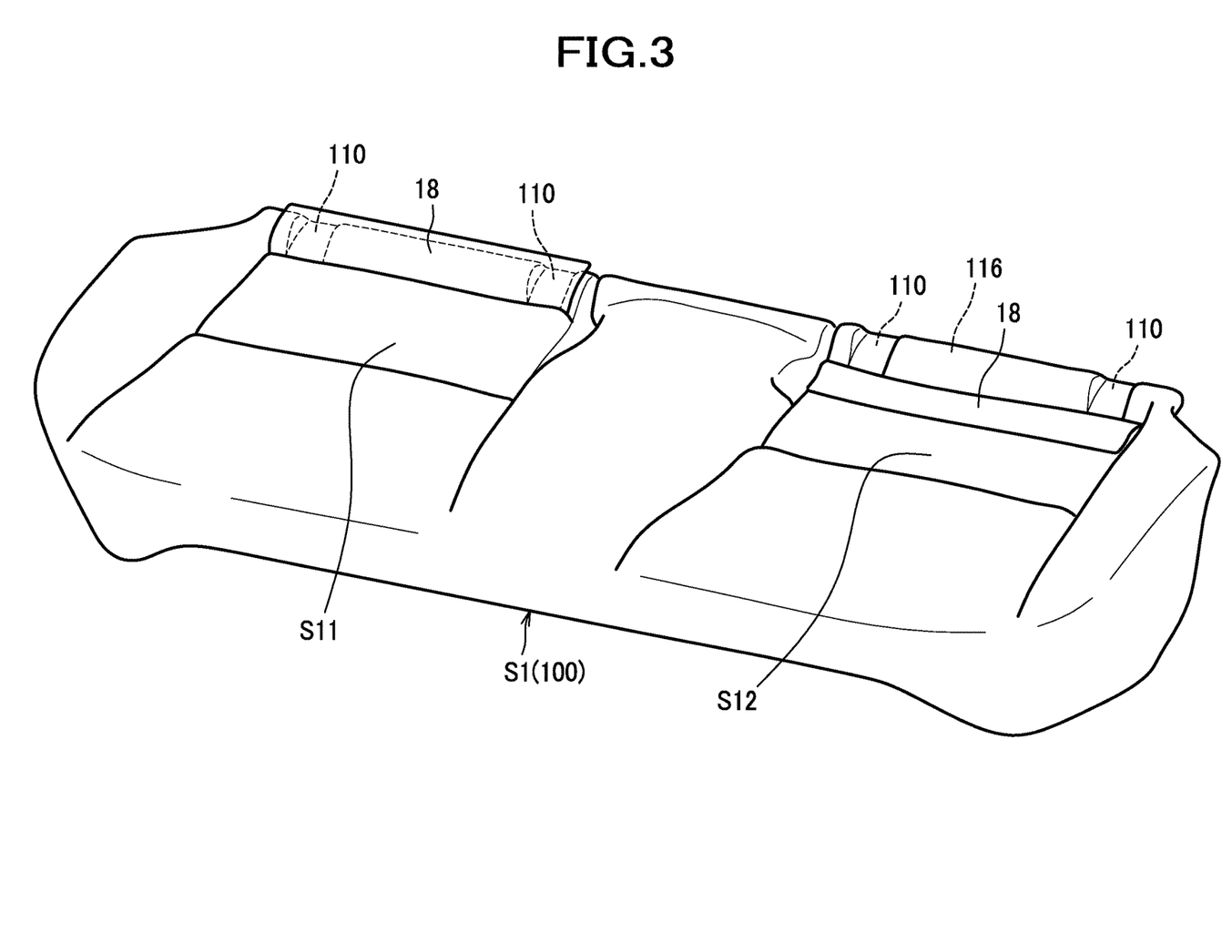
FIG. 3 is a perspective view of a seat cushion.

As shown in FIG. 3, a laterally extending ridge 116 is formed on a rear region of an upper surface of the seat cushion pad 100 of the seat cushion S1. In this ridge 116 are formed recesses 110 that are each downwardly recessed to allow the arm 30 of the aforementioned child seat CS to be inserted therein to thereby achieve the attachment of the child seat CS. As shown in FIG. 2, the striker 51 is configured such that the engageable portion 51A thereof is disposed in a rear side of a space defined by the recess 110 so that the engageable portion 51A smoothly engages into the groove 31 when the arm 30 is inserted into the recess 110.

As shown in FIG. 2, the seating surfaces S11, S12 of the seat cushion S1 are shaped to slope down from the front toward the rear. A bottom surface 111 of the recess 110 has a crest 115 provided at a center in the front-rear direction and configured to extend laterally, and a front-side half region 111A extending frontward from the crest 115 is a substantially horizontal surface, while a rear-side half region 111B extending rearward from the crest 115 is configured to slope down from the front toward the rear along the sloping seating surfaces S11, S12. In other words, the region of the bottom surface 111 on the rear side of the crest 115 is substantially parallel to the seating surface S11, S12. In addition, the crest 115 of the bottom surface 111 is opposite to a lower end S21 of the seat back S2 of the seat to which the child seat CS has not been attached. To be more specific, the crest 115 of the bottom surface 111 is positioned substantially directly under the lower end S21 of the seat back S2

As shown in FIG. 3, the recess 110 is provided at two laterally separate positions within a region corresponding to the right seat bottom, and at two laterally separate positions within a region corresponding to the left seat bottom. The seat cushion S1 includes covers 18 for the respective seating surfaces S11, S12, such that one cover 18 is provided over the rear region of each seating surface S11, S12 to make the corresponding recesses 110 unobtrusive so as to improve the outer appearance of the car seat S in ordinary times. The cover 18 is sewn on at its front end region and fixed to the outer covering 10 while its rear end is free, as shown in the right seat bottom. The cover 18 is drawn out from between the seat back S2 and the seat cushion S1 frontward, as shown in the left seat bottom, when a child seat CS is attached. Although the material for the cover 18 may be selected as desired, it is preferable that the same material as those for the outer covering 10 of the seating surfaces S11, S12 be used therefor.

Figure 4:
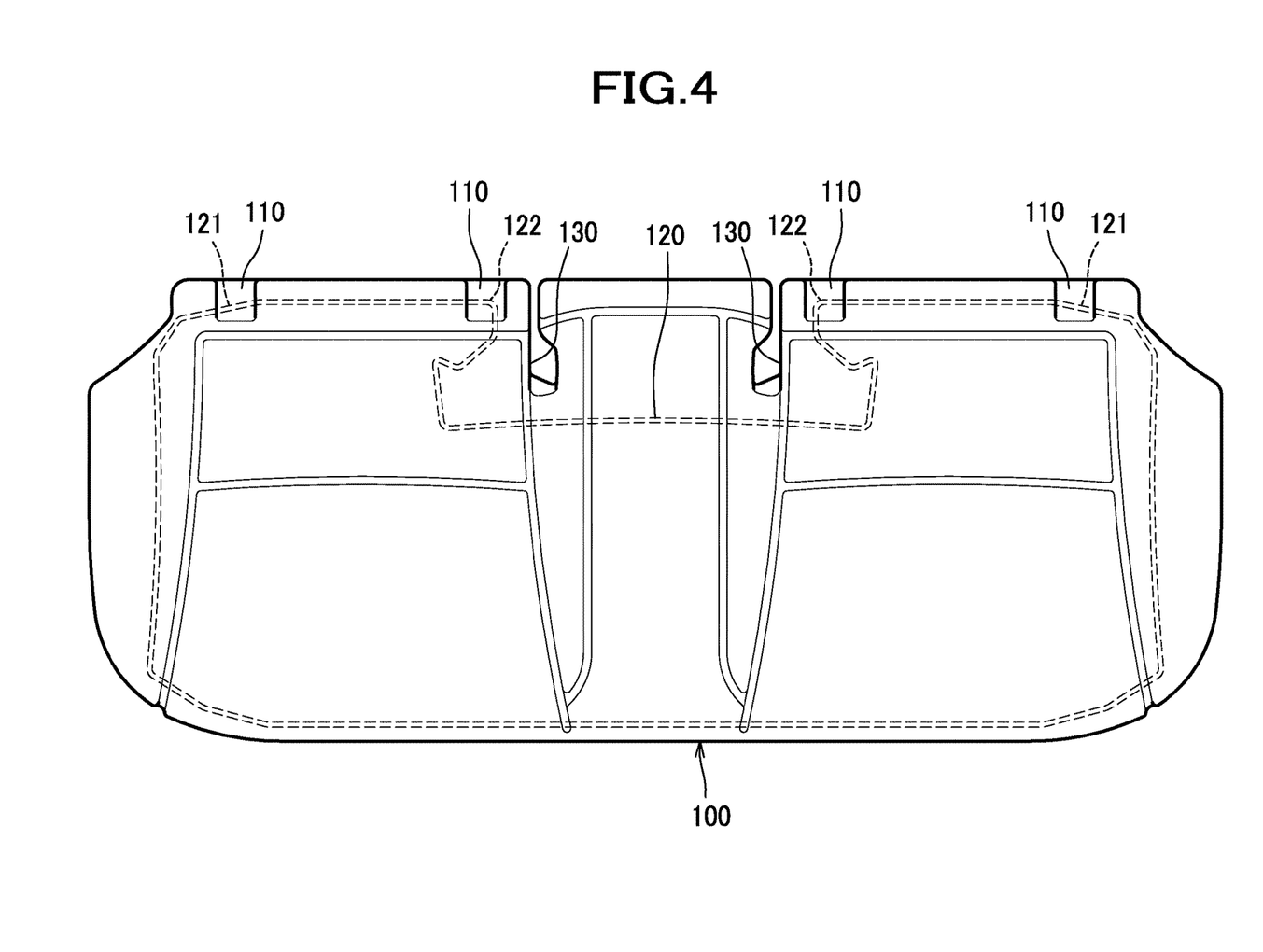
FIG. 4 is a top view of a seat cushion pad with arrangement of a reinforcing member shown therein.

As shown in FIG. 4, the seat cushion pad 100 includes an embedded reinforcing wire 120 as one example of reinforcing member. The reinforcing wire 120 is made of metal wire, and embedded in the urethane foam of the seat cushion pad 100 by insert molding during the molding process of the seat cushion pad 100.

The reinforcing wire 120 is disposed under each of the recesses 110, and includes an oblique portion 121 (disposed under the laterally outer one of the two recesses 110 in the rear region of each seat bottom) that extends obliquely with respect to a lateral direction, i.e., slanting frontward in a laterally outward direction, and a bent portion 122 (disposed under the laterally inner one of the two recesses 110 in the rear region of each seat bottom) that is bent substantially at right angles. In this configuration with the oblique portion 121 under the laterally outer recess 110, the reinforcing wire 120 can be so arranged under the recess 110 as to span long enough to compensate for any decrease in rigidity of the seat cushion pad 100 caused by formation of the recess 110. Furthermore, with the bent portion 122 under the laterally inner recess 110, the rigidity of the reinforcing wire 120 can be increased so that the decrease in rigidity of the seat cushion pad 100 caused by formation of the recess 110 can be effectively compensated for. Accordingly, the seat cushion pad 100 has a sufficient rigidity despite presence of the four recesses 110, which ensures greater ease in handling during attachment of the seat cushion S1 to the frame, and serves to reduce unnecessary distortion of the seat cushion pad 100.

The seat cushion pad 100 has slits 130, as one example of an opening, formed at left or right sides of the recesses 110, to be more specific, on laterally inner sides of the two inner recesses 110 of the total four recesses 110. Each slit 130 is a portion indented from a rear end to the front, extending from a position rearward of the recess 110 to a position frontward of the recess; the slit 130 extends through the seat cushion pad 100 in an upward-downward direction. The slit 130 provides a space through which a buckle of a seat belt (not shown) is passed.

Figure 5:
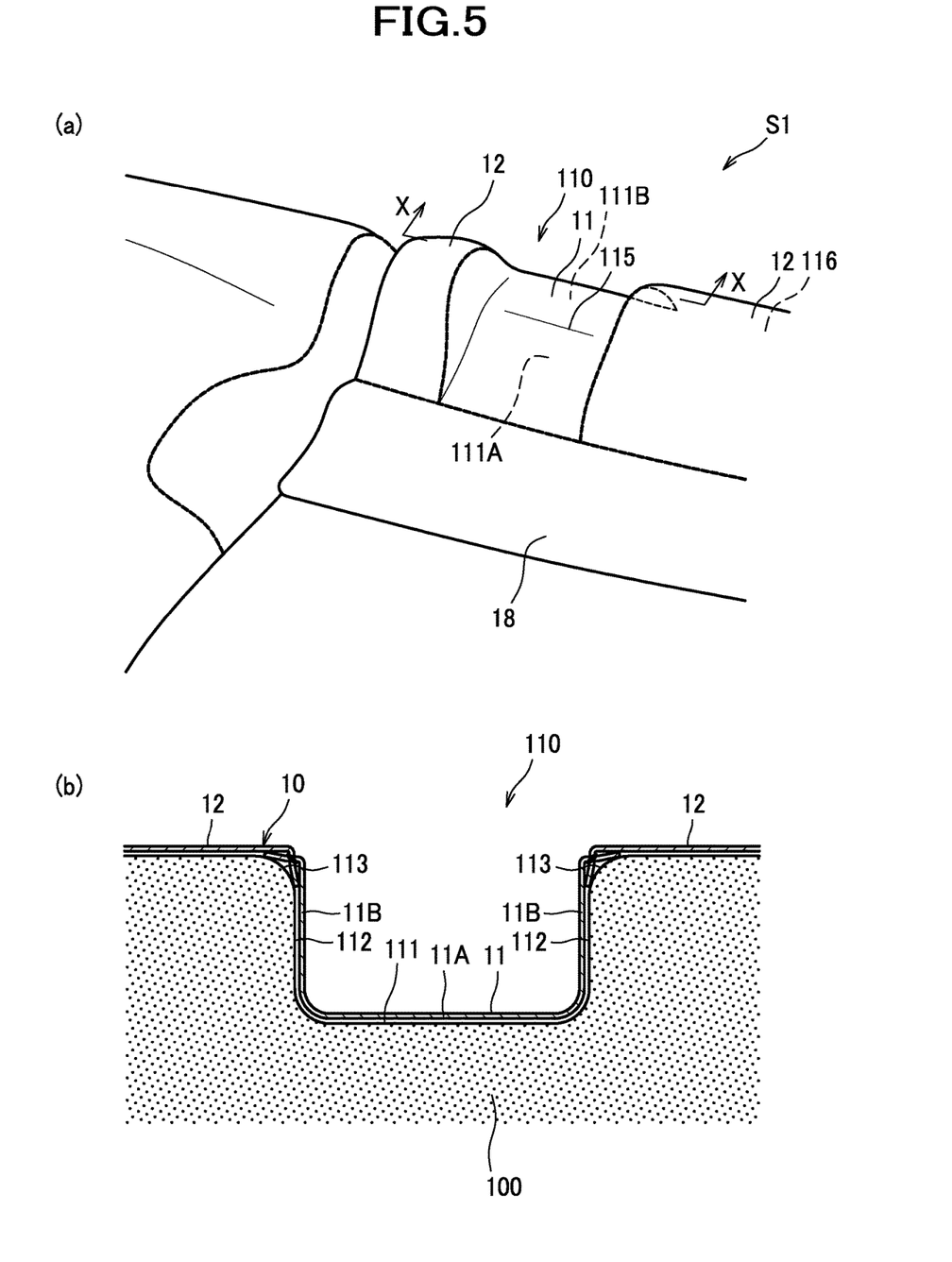
Figure 6:
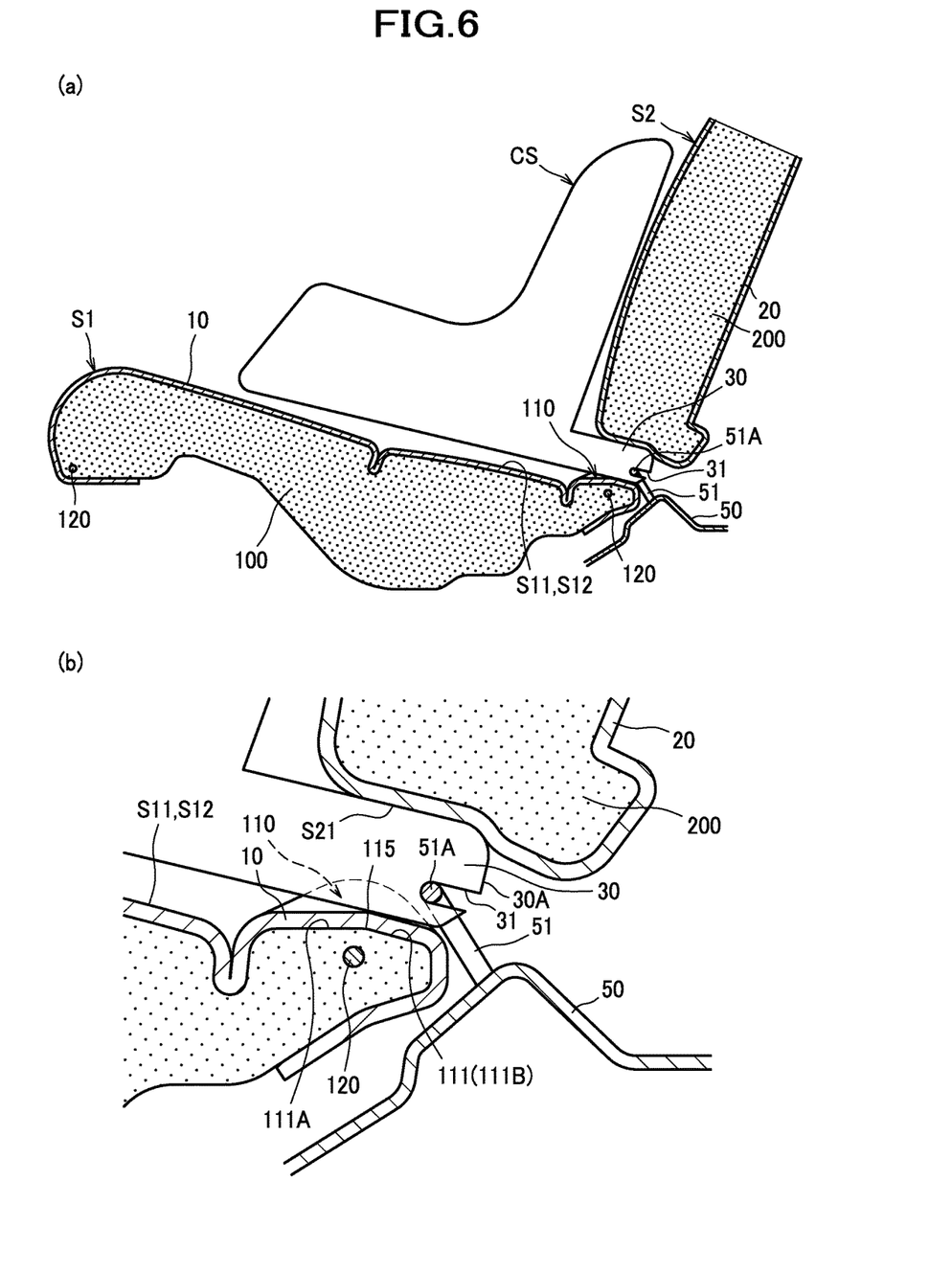

As shown in FIG. 5 (a), (b), the outer covering 10 includes a first outer covering portion 11 corresponding to the recess 110 and a second outer covering portion 12 corresponding to a position adjacent to the recess 110; the first outer covering portion 11 and the second outer covering portion 12 are configured as separate members. The first outer covering portion 11 is made of a continuous member without any rifts, and configured to extend along the surface of the recess 110 such that the recess 110 is entirely coated therewith.

The first outer covering portion 11 is preferably in close contact with the surface of the recess 110, and more preferably bonded to the surface of the recess 110. The bonding applicable herein may be achieved by using an adhesive agent or a double-faced adhesive tape, or by foaming an urethane foam material inside the outer covering 10 in the process of forming the seat cushion pad 100 so that the urethane foam material is directly adhered to the inside surface of the outer covering 10. With this configuration in which the first outer covering portion 11 is in close contact with or bonded to the surface of the recess 110, the first outer covering portion 11 is particularly effectively prevented from being dislocated relative to the recess 110.

The recess 110 includes a bottom surface 111 and side surfaces 112 raised from left and right ends of the bottom surface 111. The first outer covering portion 11 includes a bottom portion 11A covering the bottom surface 111, and side portions 11B covering the side surfaces 112; in the present embodiment, the bottom portion 11A and the side portions 11B are configured as a single-piece integral member. In other words, the first outer covering portion 11 is configured as a single part. Accordingly, the number of parts of the outer covering 10 can be made smaller in comparison with an alternative embodiment in which the first outer covering portion 11 is made of a plurality of parts, so that increase in cost can be suppressed.

The first outer covering portion 11 and the second outer covering portion 12 are sewn together along a border or an edge 113 between the recess 110 and its surrounding portion (portion adjacent to the recess 110) in the seat cushion pad 100. Accordingly, the first outer covering portion 11 can be shaped conformably, and the outer covering 10 can be provided over the recess 110 neatly along the surface of the recess 110.

Hereupon, the first outer covering portion 11 and the second outer covering portion 12 may be made of the same material or of materials different from each other. Where the first outer covering portion 11 and the second outer covering portion 12 are made of the same material, the outer appearance of the seat cushion S1 can be improved; on the other hand, where the first outer covering portion 11 and the second outer covering portion 12 are made of different materials, the first outer covering portion 11 can be made of a material suitable for the arm 30 of the child seat CS to be inserted therealong. To be more specific, irrespective of the material of the second outer covering portion 12, the material of the first outer covering portion 11 can be selected among any materials suitable for the arm 30 to be inserted therealong, so that improvement in durability and outer appearance can be carried out. For example, the first outer covering portion 11 may be of a material higher in tensile strength or of a material smaller in frictional resistance, in comparison with the material for the second outer covering portion 12. In one more specific example, where the second outer covering portion 12 is made of tricot, the material of the first outer covering portion 11, if made of needle punch nonwoven fabric, can be of high tensile strength, and if made of synthetic leather, can be of small frictional resistance.

When a child seat CS is attached to the car seat S configured as described above, the cover 18 is drawn out to the front as that of the left seat bottom shown in FIG. 3, and the child seat CS is placed on the seating surface S11, S12 shown in FIG. 2. Then, the child seat CS with the arms 30 aligned with the recesses 110 is slid to the rear on the seating surface S11, S12. The arms 30 are thus inserted into the recesses 110, and the grooves 31 are engaged with the engageable portions MA of the strikers 51.

At this time, the seating surfaces S11, S12 configured to slope down from the front toward the rear may help the child seat CS to be slid with a small force, and the substantially parallel arrangement of the seating surfaces S11, S12 and the rear-side half regions 111B of the bottom surface 111 of the recess 110 may help the arms 30 to be inserted smoothly without hitching on the bottom surfaces 111 of the recesses 110 when the arms 30 are inserted along the recesses 110. Since the lower end S21 of the seat back S2 and the crest 115 of each bottom surface 11 are opposite to each other, and a gap between the seat back S2 and the rear-side region of each crest 115 is made greater toward the rear, the arms 30 can be inserted smoothly into the recesses 110 without any unnecessary constraint placed on the arms 30 by the seat back S2 and the bottom surfaces 111. Furthermore, since the slits 130 are provided at the laterally inner sides of the recesses 110 of the car seat S, the recesses 110 are easily deformable in a downward direction, so that the arms 30 can be inserted with relatively small force.

Since the car seat S according to the present embodiment is configured such that the outer covering 10 is laid over the whole recesses 110, the outer covering 10 has no free ends in vicinity of the recesses 110. Therefore, the outer covering 10 is made unlikely to be dislocated relative to the seat cushion pad 100. Moreover, since the outer covering 10 is provided along the surfaces of the recesses 110, it is unlikely that the outer covering's unsupported portion extending over the recesses 110 would be unnecessarily dragged by the arms 30 when the arms 30 are inserted into the recesses 110; therefore, the arms 30 can be inserted into the recesses 110 smoothly and a dislocation of the outer covering 10 relative to the seat cushion pad 100 can be suppressed. Accordingly, even when the child seat CS is attached and removed repeatedly, the attachment and removal of the child seat can be carried out easily, and the degradation of the outer appearance of the seat can be suppressed.

Furthermore, in the car seat S according to the present embodiment, since the first outer covering portion 11 and the second outer covering portion 12 are configured as separate members, even if the material for the second outer covering portion 12 is not ductile or stretchy, the first outer covering portion 11 may be shaped to conform with the recesses 110, so that the outer covering 10 can be easily provided along the recesses 110.

Although one embodiment of the present invention has been described above, the present invention is not limited to the above-described embodiment, and can be implemented with any appropriate modifications made thereto.

Figure 7:
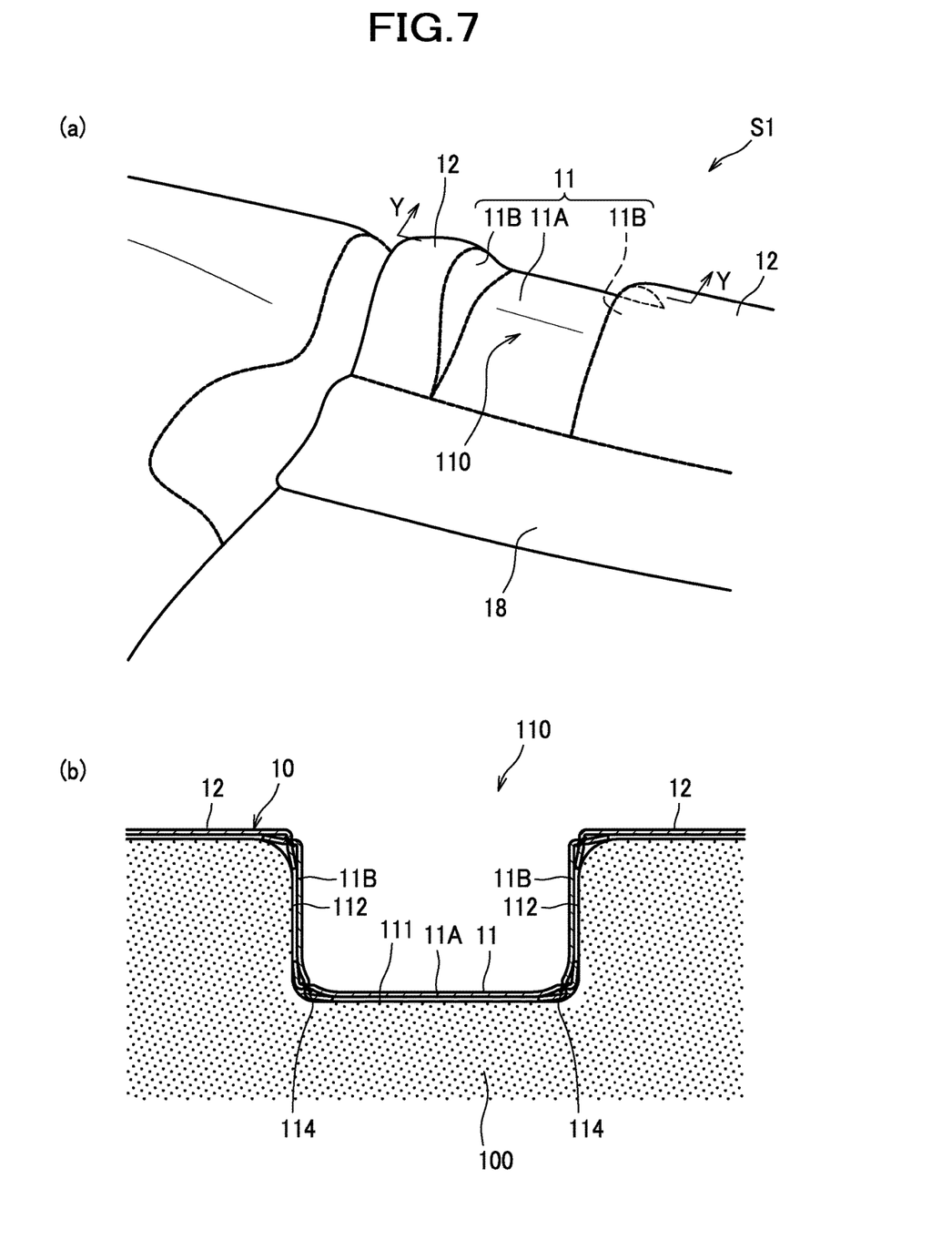

For example, the first outer covering portion 11 may not necessarily be configured as a single part; as shown in FIG. 7 (a), (b), the bottom portion 11A and the side portions 11B may be configured as separate parts. In this example, the bottom portion 11A and the side portions 11B may preferably be sewn together along the borders between the bottom surface 111 and the side surfaces 112 of the recess 110, i.e., corners 114. With this configuration in which the bottom portion 11A and the side portions 11B are configured as separate members, even if the surface of the recess 110 has a shape not developable on a plane, the first outer covering portion 11 can be designed without difficulty, so that the recess 110 can be given a high degree of flexibility in shape. Furthermore, the bottom portion 11A and the side portions 11B sewn together along the borders between the bottom surface 111 and the side surfaces 112 of the recess 110 will be able to produce a good outer appearance.

Figure 8:
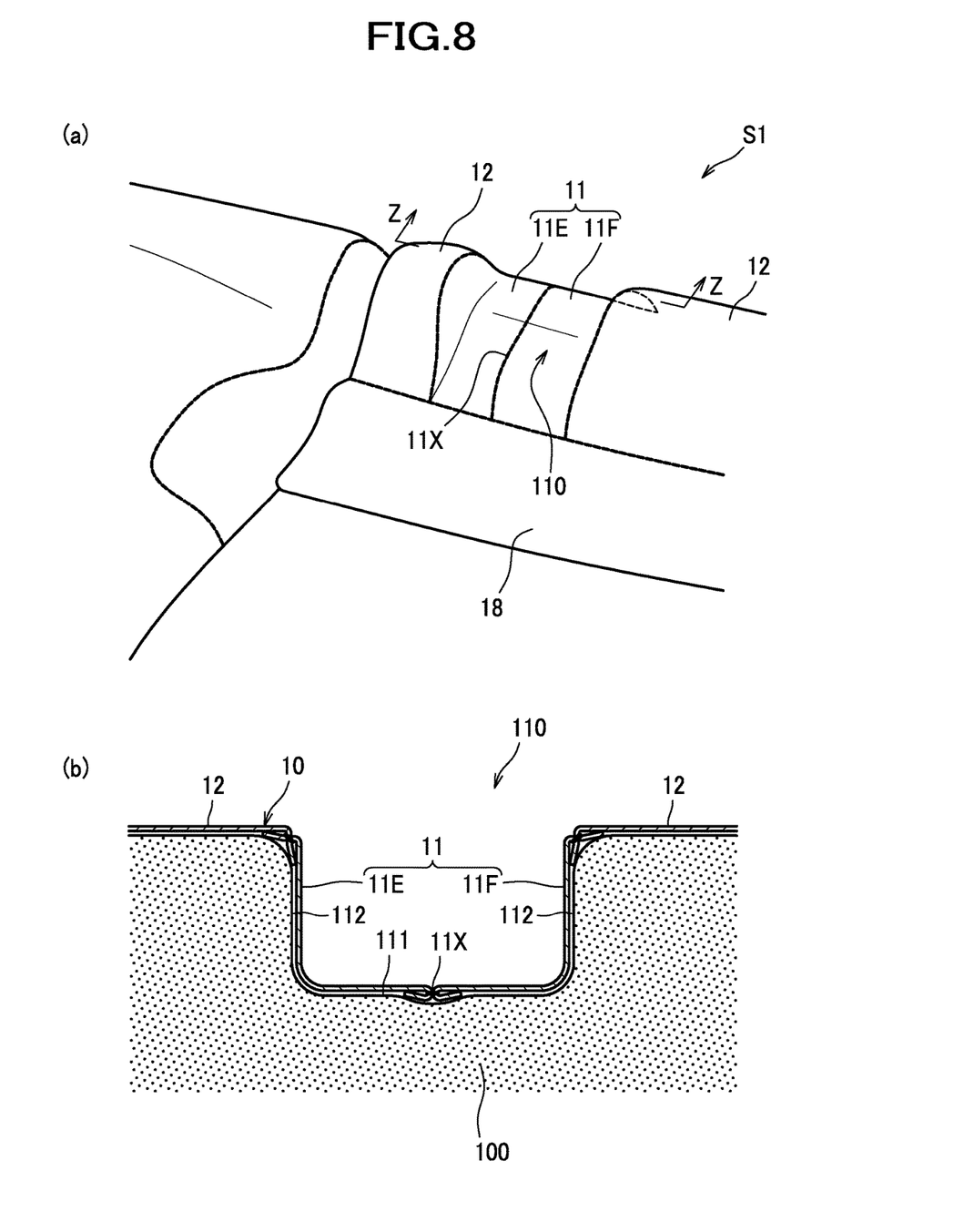

As shown in FIG. 8 (a), (b), where the first outer covering portion 11 is made up of a plurality of members, the sewing line may not necessarily be aligned with the border of the bottom surface 111 and the side surface 112, but may be shifted from this border. For example, the first outer covering portion 11 may be configured to include a right-side portion 11E covering the right-side surface 112 and a portion of the bottom surface 111 from the right-side surface 112 to the center of the bottom surface, and a left-side portion 11F covering the left-side surface 112 and a portion of the bottom surface 111 from the left-side surface 112 to the center of the bottom surface 111, wherein the right-side portion 11E and the left-side portion 11F are sewn together along the sewing line 11X extending in the front-rear direction at the laterally central position of the bottom surface 111.

Although the above-described embodiment is illustrated as having covers 18, the presence or absence of the covers 18 may be chosen as desired.

In the above-described embodiments, the car seat S to be provided at the rear seat for use in an automobile is illustrated as an example of the vehicle seat, but the present invention is not limited thereto, and is also applicable to a vehicle seat to be provided at the front seat, or any other vehicle seats for use, for example, in rail cars, ships and aircrafts, etc.

The invention claimed is:

1. A vehicle seat comprising a seat cushion and a seat back, between which an arm provided at a rear side of a child seat is insertable to thereby allow the child seat to be attached to the vehicle seat,
    wherein the seat cushion includes a seat cushion pad and an outer covering with which the seat cushion pad is covered,
    the seat cushion pad has a recess for the arm to be inserted therein, the recess being provided at a rear region of an upper surface thereof,
    the outer covering is configured to extend along a surface of the recess such that the recess is entirely coated therewith,
    the outer covering includes a first outer covering portion corresponding to the recess and a second outer covering portion corresponding to a position adjacent to the recess,
    the first outer covering portion and the second outer covering portion are configured as separate members,
    the recess has a bottom surface and a side surface raised from the bottom surface,
    the first outer covering portion includes a bottom portion corresponding to the bottom surface and a side portion corresponding to the side surface, and
    the bottom portion and the side portion are configured as separate members.

2. The vehicle seat according to claim 1, wherein the first outer covering portion and the second outer covering portion are sewn together along a border between the recess and a portion adjacent to the recess.

3. The vehicle seat according to claim 1, wherein the bottom portion and the side portion are sewn together along a border between the bottom surface and the side surface.

4. The vehicle seat according to claim 1, wherein a seating surface of the seat cushion is shaped to slope down from front toward rear,
    wherein a bottom surface of the recess has a region configured to slope down from front toward rear along the sloping seating surface.

5. The vehicle seat according to claim 4, wherein the bottom surface has a crest provided in a position opposite to a lower end of the seat back.

6. The vehicle seat according to claim 1, wherein the first outer covering portion and the second outer covering portion are made of different materials.

7. The vehicle seat according to claim 1, wherein the seat cushion has an opening provided to extend therethrough in an upward-downward direction at a left or right side of the recess, the opening extending from a position rearward of the recess to a position frontward of the recess.

8. The vehicle seat according to claim 1, wherein the seat cushion pad includes a reinforcing member under the recess.

9. The vehicle seat according to claim 6, wherein the first outer covering portion is of a material smaller in friction resistance in comparison with a material for the second outer covering portion.

10. A vehicle seat comprising a seat cushion and a seat back, between which an arm provided at a rear side of a child seat is insertable to thereby allow the child seat to be attached to the vehicle seat, wherein the seat cushion includes a seat cushion pad and an outer covering with which the seat cushion pad is covered, the seat cushion pad includes a laterally extending ridge protruding upward at a rear region of an upper surface of the seat cushion, the ridge being partially recessed to provide a recess which opens upward, frontward and rearward, the recess having a bottom surface and left and right side surfaces, whereby the arm of the child seat is allowed to be held between the bottom surface of the recess and a lower end of the seat back, the outer covering is configured to extend along the bottom, left side and right side surfaces of the recess such that the recess is entirely coated therewith, and the seat cushion has an opening provided to extend therethrough in an upward-downward direction at a left or right side of the recess, the opening extending from a position rearward of the recess to a position frontward of the recess.

11. A vehicle seat comprising a seat cushion and a seat back, between which an arm provided at a rear side of a child seat is insertable to thereby allow the child seat to be attached to the vehicle seat, wherein the seat cushion includes a seat cushion pad and an outer covering with which the seat cushion pad is covered, the seat cushion pad includes a laterally extending ridge protruding upward at a rear region of an upper surface of the seat cushion, the ridge being partially recessed to provide a recess which opens upward, frontward and rearward, the recess having a bottom surface and left and right side surfaces, whereby the arm of the child seat is allowed to be held between the bottom surface of the recess and a lower end of the seat back, the outer covering is configured to extend along the bottom, left side and right side surfaces of the recess such that the recess is entirely coated therewith, and the seat cushion pad includes a reinforcing member under the bottom surface of the recess.

12. The vehicle seat according to claim 11, wherein the reinforcing member includes a wire.

13. The vehicle seat according to claim 12, wherein a portion of the wire disposed under the bottom surface of the recess includes an oblique portion extending obliquely with respect to a lateral direction.

14. The vehicle seat according to claim 12, wherein a portion of the wire disposed under the bottom surface of the recess includes a bent portion.

* * * * *